(12) United States Patent
Summers et al.

(10) Patent No.: US 11,226,972 B2
(45) Date of Patent: Jan. 18, 2022

(54) RANKING COLLECTIONS OF DOCUMENT PASSAGES ASSOCIATED WITH AN ENTITY NAME BY RELEVANCE TO A QUERY

(71) Applicant: INTERNATIONAL BUSINESS MACHINES CORPORATION, Armonk, NY (US)

(72) Inventors: Kristen M. Summers, Takoma Park, MD (US); Christopher F. Ackermann, Fairfax, VA (US); Andrew Doyle, Mount Rainer, MD (US); Michael Drzewucki, Woodbridge, VA (US); Charles E. Beller, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/278,856

(22) Filed: Feb. 19, 2019

(65) Prior Publication Data

US 2020/0265054 A1 Aug. 20, 2020

(51) Int. Cl.
| | | |
|---|---|---|
| *G06F 16/2457* | (2019.01) | |
| *G06F 16/2458* | (2019.01) | |
| *G06F 16/28* | (2019.01) | |
| *G06F 16/93* | (2019.01) | |

(52) U.S. Cl.
CPC .... *G06F 16/24578* (2019.01); *G06F 16/2468* (2019.01); *G06F 16/285* (2019.01); *G06F 16/93* (2019.01)

(58) Field of Classification Search
CPC ........... G06F 16/24578; G06F 16/2468; G06F 16/285; G06F 16/93; G06F 16/9535

USPC ........................................................ 707/730
See application file for complete search history.

(56) References Cited

U.S. PATENT DOCUMENTS

| | | | |
|---|---|---|---|
| 5,497,486 | A | 3/1996 | Stolfo |
| 5,668,991 | A | 9/1997 | Dunn |
| 6,263,364 | B1 | 7/2001 | Najork et al. |
| 6,438,543 | B1 | 8/2002 | Kazi et al. |
| 6,480,859 | B2 | 11/2002 | Sanjay |
| 6,564,210 | B1 | 5/2003 | Korda et al. |
| 6,594,658 | B2 | 7/2003 | Woods |
| 7,493,344 | B2 | 2/2009 | Wald |

(Continued)

OTHER PUBLICATIONS

"List of IBM Patents or Patent Applications Treated as Related", dated Mar. 19, 2019, 2 pages.

(Continued)

*Primary Examiner* — Syed H Hasan
*Assistant Examiner* — Nicholas E Allen
(74) *Attorney, Agent, or Firm* — William H. Hartwell

(57) ABSTRACT

Query service receives a query comprising at least a name component. The query service searches a document corpus to identify multiple passages, each comprising a mention of the name component within a selection of one or more documents of the document corpus. The query service collects bins, each bin comprising a distinct selection of the passages from the one or more documents, each of the bins identifying a separate relationship the name component participates in within the distinct selection of passages. The query service assesses a separate score of each respective bin reflecting the relevance of each respective bin to the query. The query service returns a response to the query with the bins each ranked according to each separate score.

20 Claims, 7 Drawing Sheets

(56) References Cited

U.S. PATENT DOCUMENTS

| | | |
|---|---|---|
| 8,112,390 B2 | 2/2012 | Gejdos |
| 8,219,557 B2 | 7/2012 | Grefenstette et al. |
| 8,463,750 B2 | 6/2013 | Kazi |
| 8,538,989 B1* | 9/2013 | Datar .................. G06F 16/313 |
| | | 707/780 |
| 8,561,185 B1 | 10/2013 | Muthusrinivasan et al. |
| 8,890,827 B1 | 11/2014 | Nordstrom |
| 9,092,989 B2 | 7/2015 | Agarwal et al. |
| 9,348,915 B2 | 5/2016 | Iwasa et al. |
| 9,619,457 B1 | 4/2017 | Gillick et al. |
| 9,679,018 B1 | 6/2017 | Yuksel et al. |
| 9,767,127 B2 | 9/2017 | Feldschuh |
| 10,268,641 B1 | 4/2019 | Guha |
| 10,474,708 B2 | 11/2019 | Roberts |
| 10,599,732 B2 | 3/2020 | Hassanzadeh |
| 10,621,183 B1 | 4/2020 | Chatterjee |
| 10,664,660 B2 | 5/2020 | Li |
| 10,936,819 B2* | 3/2021 | Beller .................. G06N 5/027 |
| 2005/0027681 A1 | 2/2005 | Bernstein |
| 2005/0154615 A1 | 7/2005 | Rotter |
| 2005/0154761 A1* | 7/2005 | Lee .................. G06F 16/907 |
| 2006/0095473 A1 | 5/2006 | Fox |
| 2007/0022072 A1* | 1/2007 | Kao .................. G06F 16/345 |
| | | 706/45 |
| 2008/0140616 A1 | 6/2008 | Encina |
| 2008/0222105 A1 | 9/2008 | Matheny |
| 2009/0254512 A1 | 10/2009 | Broder et al. |
| 2011/0035374 A1* | 2/2011 | Vadrevu .................. G06F 16/951 |
| | | 707/728 |
| 2011/0047161 A1 | 2/2011 | Myaeng |
| 2012/0078888 A1* | 3/2012 | Brown .................. G06F 16/24578 |
| | | 707/723 |
| 2012/0089622 A1* | 4/2012 | Fan .................. G06F 16/334 |
| | | 707/749 |
| 2013/0060753 A1 | 3/2013 | Lukichev |
| 2013/0173639 A1 | 7/2013 | Chandra et al. |
| 2014/0074826 A1 | 3/2014 | Cooper et al. |
| 2014/0222792 A1 | 8/2014 | Groeneveld et al. |
| 2015/0074081 A1 | 3/2015 | Falter |
| 2015/0154316 A1 | 6/2015 | Lightner et al. |
| 2015/0370859 A1 | 12/2015 | Bakir et al. |
| 2016/0012126 A1* | 1/2016 | Franceschini .......... G06F 16/951 |
| | | 707/735 |
| 2016/0078038 A1* | 3/2016 | Solanki .................. G06F 16/345 |
| | | 707/727 |
| 2016/0147871 A1* | 5/2016 | Kalyanpur ............ G06F 40/284 |
| | | 707/728 |
| 2016/0224621 A1 | 8/2016 | Bousquet |
| 2016/0357857 A1 | 12/2016 | Langmead |
| 2017/0060856 A1* | 3/2017 | Turtle .................. G06F 16/93 |
| 2017/0124075 A1 | 5/2017 | Deng |
| 2017/0161615 A1 | 6/2017 | Gordon et al. |
| 2017/0228372 A1* | 8/2017 | Moreno .............. G06F 16/3329 |
| 2017/0277668 A1* | 9/2017 | Luo .................. G06F 16/345 |
| 2017/0323019 A1 | 11/2017 | Hall |
| 2017/0351752 A1 | 12/2017 | Meehan et al. |
| 2017/0364519 A1 | 12/2017 | Beller et al. |
| 2017/0364804 A1 | 12/2017 | Beller et al. |
| 2018/0052817 A1* | 2/2018 | Bethard .................. G06F 40/14 |
| 2018/0089307 A1* | 3/2018 | Cohen .................. G06F 16/93 |
| 2018/0336268 A1 | 11/2018 | Xu |
| 2019/0278777 A1 | 9/2019 | Malik |
| 2020/0034370 A1 | 1/2020 | Barron |
| 2020/0183995 A1 | 6/2020 | Hassanzadeh |
| 2020/0210647 A1 | 7/2020 | Panuganty |
| 2020/0265042 A1 | 8/2020 | Beller et al. |
| 2020/0265114 A1 | 8/2020 | Beller et al. |
| 2021/0165772 A1 | 6/2021 | Ackermann |

OTHER PUBLICATIONS

Alam et al., "Structured and Unstructured Document Summarization: Design of a Commercial Summarizer using Lexical Chains", Proceedings of the Seventh International Conference on Document Analysis and Recognition, Jan. 2003, 7 pages.

Benton et al., "Faster (and Better) Entity Linking with Cascades", accessible via the Internat at <http://www.cs.jhu.edu/%7Emdredze/publications/2014_nips_slinky_cascades.pdf>, 6 pages.

Jayaram et al., "Querying Knowledge Graphs by Example Entity Tuples", 2014 IEEE 30th International Conference on Data Engineering, 2014, 16 pages.

USPTO Notice of Allowance, dated Oct. 16, 2020, U.S. Appl. No. 16/278,805, filed Feb. 19, 2019, In re Beller, 20 pages.

USPTO Notice of Allowance, dated Aug. 11, 2020, U.S. Appl. No. 16/278,805, filed Feb. 19, 2019, In re Beller, 23 pages.

No author, "Cluster Analysis", Wikipedia, accessed online from <https://en.wikipedia.org/wiki/Cluster_analysis> as of Oct. 1, 2020, 21 pages.

Non-Final Office Action, dated Oct. 5, 2020, U.S. Appl. No. 16/279,650, filed Feb. 19, 2019, In re Beller, 10 pages.

IBM, "List of IBM Patents or Patent Applications Treated as Related", Appendix P, 2 pages, dated Aug. 30, 2021.

* cited by examiner

RANKING COLLECTIONS OF DOCUMENT PASSAGES ASSOCIATED WITH AN ENTITY NAME BY RELEVANCE TO A QUERY

This invention was made with United States Government support under contract number 2013-12101100008. The Government has certain rights in this invention.

BACKGROUND

1. Technical Field

This invention relates in general to computing systems and more particularly to ranking collections of document passages associated with an entity name by relevance to a query.

2. Description of the Related Art

With the increased usage of computing networks, such as the Internet, the amount of information available from structured and unstructured sources has also increased.

BRIEF SUMMARY

In one embodiment, a method is directed to receiving, by a computer system, a query comprising at least a name component. The method is directed to searching, by the computer system, a plurality of documents in a document corpus to identify a plurality of passages each comprising a mention of the name component within a selection of one or more documents of the plurality of documents. The method is directed to collecting, by the computer system, a plurality of bins each comprising a distinct selection of the plurality of passages from the one or more documents, each of the plurality of bins identifying a separate relationship the name component participates in within the distinct selection of the plurality of passages. The method is directed to assessing, by the computer system, a separate score of each respective bin of the plurality of bins reflecting the relevance of each respective bin to the query. The method is directed to returning, by the computer system, a response to the query with the plurality of bins each ranked according to each separate score.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to receive a query comprising at least a name component. The stored program instructions comprise program instructions to search a plurality of documents in a document corpus to identify a plurality of passages each comprising a mention of the name component within a selection of one or more documents of the plurality of documents. The stored program instructions comprise program instructions to collect a plurality of bins each comprising a distinct selection of the plurality of passages from the one or more documents, each of the plurality of bins identifying a separate relationship the name component participates in within the distinct selection of the plurality of passages. The stored program instructions comprise program instructions to assess a separate score of each respective bin of the plurality of bins reflecting the relevance of each respective bin to the query. The stored program instructions comprise program instructions to return a response to the query with the plurality of bins each ranked according to each separate score.

In another embodiment, a computer program product comprises a computer readable storage medium having program instructions embodied therewith, wherein the computer readable storage medium is not a transitory signal per se. The program instructions are executable by a computer to cause the computer to receive, by a computer, a query comprising at least a name component. The program instructions are executable by a computer to cause the computer to search, by the computer, a plurality of documents in a document corpus to identify a plurality of passages each comprising a mention of the name component within a selection of one or more documents of the plurality of documents. The program instructions are executable by a computer to cause the computer to collect, by the computer, a plurality of bins each comprising a distinct selection of the plurality of passages from the one or more documents, each of the plurality of bins identifying a separate relationship the name component participates in within the distinct selection of the plurality of passages. The program instructions are executable by a computer to cause the computer to assess, by the computer, a separate score of each respective bin of the plurality of bins reflecting the relevance of each respective bin to the query. The program instructions are executable by a computer to cause the computer to return, by the computer, a response to the query with the plurality of bins each ranked according to each separate score.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 2 is a block diagram illustrates one example of components of a complex query received by a query system that returns entity bins ranked by relevance to the complex query, each entity bin including a collection of documents that an entity name occurs in;

FIG. 3 is a block diagram illustrating one example of entity bins ranked by relevance to a complex query, each entity bin including a collection of documents that an entity name occurs in;

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
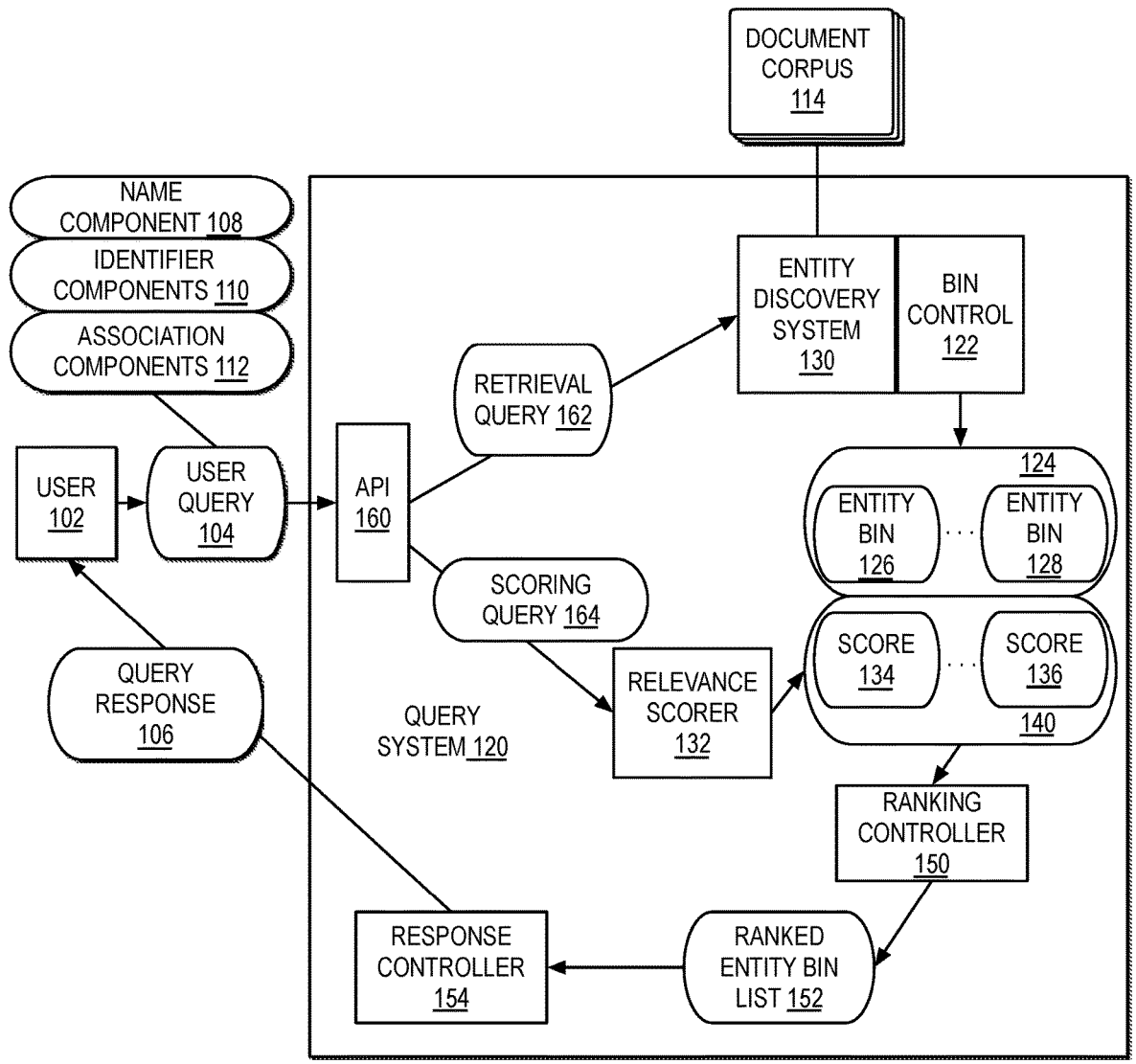
FIG. 1 is a block diagram illustrating one example a query system for ranking collections of document passages that an entity name occurs in, collected in entity bins, by relevance to a complex query.

FIG. 1 illustrates a block diagram of one example of a query system for ranking collections of document passages that an entity name occurs in, collected in entity bins, by relevance to a complex query.

In one example, a user 102 submits a user query 104 to a query system 120. In one example, query system 120 implements one or more application programming interfaces (APIs), such as API 160, for receiving and responding to user queries. In one example, query system 120 provides a query service for finding disambiguated entities of interest to a user's analytic focus in user query 104.

User query 104 includes one or more types of query elements, referred to as a complex query. For example, user query 104 includes a name component 108 and may include one or more identifier components 110 and one or more association components 112. For example, name component 108 identifies one or more types of name elements and may include a single word, such as a first name or last name, or multiple words, such as one or more of a first name, middle name, and last name. In one example, identifier components 110 include one or more types of identifier information that is more likely than not to uniquely identify a particular named entity identified by name component 108, such as, but not limited to, email address and issued ID number. Association components 112 includes one or more types of biographical information that either indicates or counter-indicates association with a particular named entity identified by name component 108, such as a birth date, company name, or known associate name. In additional or alternate examples, user query 104 may include additional types of query elements and components. In additional or alternate examples, user query 104 only includes name component 108.

In one example, a user may submit query 104 to search for information related to name component 108, however, the name elements in name component 108 may refer to multiple real-world entities with the same name. The term "entity" may refer to one or more of people, places, companies, events, and concepts identified in name component 108 and referred to in mentions in one or more passages of one or more documents. If all the documents discovered with name component 108 are returned to the user in response to query 104, the user may receive a volume of information with mentions of name component 108, but then have to search through the volume of documents for each mention, read the documents containing each mention, and individually evaluate whether the mention relates to a target named entity the user intended to search for. The process of a user reading through hundreds or thousands of documents is time consuming, and the user may read large volumes of documents in the process that do not relate to the target named entity the user intended to search for. In addition, if name component 108 includes a common name, a query for that common name may result in a large volume of document passages that all include the common name, but different selections of the document passages may refer to multiple different entities. According to an advantage of the present invention, query system 120 automatically performs entity disambiguation by clustering passages of documents associated with the different identities of different entities into collections, or bins, and may label each bin according to the identity reflected. In addition, according to an advantage of the invention, a user may submit query 104 with components in addition to name component 108, where the additional components provide additional context for identifying which bin is most relevant to query 104. In the example, if query 104 includes at least one of one or more identifier components 110 or one or more association components 112, one or more of these components provide additional clarification of the particular named entity with name component 108 the user intends to search for.

In particular, in the example, API 160 receives user query 140 and generates a retrieval query 162. In one example, API 160 generates retrieval query 162 to search for results comprising name component 108 and any identifier components 110, but not association components 112. In one example, association components 112 are excluded from retrieval query 162 based on a statistical probability that identifier components 110 map uniquely to an entity name and association components 112 do not necessarily map uniquely to an entity name. In particular, association components 112 may map to multiple entities with a same name, which may have a negative impact on the precision of query results.

In one example, API 160 submits retrieval query 162 to an entity discovery system 130, including a bin control 122. Entity discovery system 130 accesses a document corpus 114 and searches corpuses of documents for mentions of name component 108 and any identifier components 110 in retrieval query 162. In one example, document corpus 114 represents a continuously updated corpus of unstructured data. In addition, document corpus 114 may represent structured content. In one example, document corpus 114 may represents documents accessible via a network from multiple sources. In one example, in retrieving the large initial set of responses, entity discovery system 130 locates and classifies mentions of the name element in unstructured text into categories that may or may not be pre-defined, but are assumed to correspond to different real-world entities that share a common name. For example, a query for a particular name may result in discovery of two groups of discovered documents, where a first group refers to a first real-world entity from a first country with a first occupation and a second group refers to a second real-world entity from a second country with a second occupation. In another example, entity discovery system 130 may evaluate one or more of additional person names, organizations, occupations, locations, temporal expressions, and numerical expressions when initially identifying different groups of documents that are each assumed to correspond to different real world-entities that share a common name.

Bin control 122 navigates through passages of documents retrieved by entity discovery system 130 from document corpus 114 and organizes multiple bins 124. In the example, bin control 122 organizes each of the entity bins in bins 124 by grouping subsets of passages associated with documents in results of a query into separate collections, with each collection referred to as an individual entity bin, and all the entity bins illustrated as bins 124. In particular, in the example, bin control 122 sorts through one or more documents identified in document corpus 114 for passages, such as paragraph elements, within documents that each contain one or more mentions of name component 108, into entity bins. In the example, bins 124 includes multiple entity bins, each specified for the subset of results for a particular entity, illustrated as entity bin 126 and entity bin 128. In the example, each entity bin in bins 124 represents a tuple consisting of an entity name, a collection of document passages that entity name is mentioned in, and relationships the entity name participates in. For example, a relationship may indicate that the identity reflected in a bin is employed by another entity, such as a company. A relationship might also indicate that the identity was at some point located at a specific place.

In the example, a document passage refers to a section or subset of a total document. Bin control 122 may apply one or more filters for identifying sections or subsets that refer to name component 108 as distinguished from the content of an entire document. For example, bin control 122 may identify sections or subsets by identifying paragraph markers, sentence markers, listed item markers, or other markers within a document that distinguish between a document that includes multiple, identifiable passages. If a document does not include markers identifying sections or subsets, bin control 122 may apply additional filters to predict a portion of the content of the document including name component 108 identifiable as a passage.

In one example, an entity may refer to a person, by name, or may refer more generally to a thing capable of an independent existence that may be uniquely classified. A relationship captures how an entity is uniquely classified or how entities relate to one another. For example, a first tuple, for a first entity bin, may consist of an entity name, such as "Fred Smith", a first collection of document passages that "Fred Smith" occurs in, and a relationship of "occupation" that "Fred Smith" participates in of "accountant", while a second tuple, for a second entity bin, may consist of the entity name "Fred Smith", a second collection of document passages that "Fred Smith" occurs in, and a relationship of "occupation" that "Fred Smith" participates in of "programmer".

In the example, API 160 determines a scoring query 164 based on user query 104, including all the components of user query 104. A relevance scorer 132 receives scoring query 164 and entity bins 124 and determines scores 140, where scores 140 includes a separate score for each entity bin in bins 124 with respect to the query and where all scores fall within a well-defined range, such as [0,1]. For example, scores 140 includes a score 134 for entity bin 126 and a score 136 for entity bin 128.

In one example, to calculate scores 140, relevance scorer 132 defines a weight in a range [0,1] for each query component in scoring query 164, which includes name component 108, identifier components 110, and association components 112. In one embodiment, any identifiers in identifier components 110 all have a same first weight and any information in association components 112 all have a same second weight, with the first weight greater than the second weight. In another embodiment, each query component may have a distinct weight, but all weights for identifier components 110 are higher than all weights for association components 112. In yet another embodiment, each query component may have a distinct weight with no strict precedence between identifier components 110 and association components 112.

In another example, relevance scorer 132 defines a match function for each query component. Relevance scorer 132 scores each entity bin of bins 124 with respect to scoring query 164 by using a weighted average of the query component matches.

In the example, a ranking controller 150 evaluates scores 140 and generates a ranked entity bin list 152. In one example, ranked entity bin list 152 reflects a numerical ordering of scores 140. In another example, ranking controller 150 may apply additional rules to scores 140 to select an order of ranking of bins 124 in ranked entity bin list 152. According to an advantage of the present invention, while entity bins of bins 124 have some characteristics of structured records, relevance scorer 132 calculates scores 140 without requiring full discrete resolution decisions.

In the example, relevance scorer 132 may apply one or more rules for scoring each entity bin and ranking controller 150 may apply one or more rules for ranking scored bins to achieve a result of a selection of entity bins that best match the query score at the top of ranked entity bin list 152. The rules may be specified based on a statistical prediction that entity bins that contain identifier components 110, such as an email address, should be scored higher since the existence of identifier components 110 provides strong evidence that the entity bin represents the particular for which the user queried. In one example, identifier components 110 may be matched by the occurrence of something interpretable as the identifier with a right relationship. The rules may also be specified based on a statistical prediction entity bins that contain association components 112 may also boost the score for an entity bin, but the degree to which the score is boosted by may be dependent upon the quantity or frequency of occurrence of association components 112, where the quantity or frequency is a proxy for the strength of the association.

In addition, in the example, relevance scorer 132 and ranking controller 140 may apply rules that assess a quality of matches between query components and elements within bin components and specify rules based on goals set for the quality of matches. For example, a goal of the rules applied by relevance scorer 132 and ranking controller 140 may include that a bin with good matches to more query components should score higher than a bin with good matches to fewer query components, for the same query. Another goal of the rules applied by relevance scorer 132 and ranking controller 140 may include that a bin with better matches to some number of query of components should score higher than a bin with moderate or worse matches to that same number of query components, for the same query. Another goal of the rules applied by relevance scorer 132 and ranking controller 140 may include that a bin with moderate matches to more query components may or may not score higher than a bin with good matches to fewer query components, for the same query. Another goal of the rules applied by relevance scorer 132 and ranking controller 140 is that a particular bin may be returned in response to different queries, where if a larger percentage of matches with the bin is higher for one query, the score for that bin should be higher for that query as well.

A response controller 154 formats ranked entity bin list 152 for return to the user in a query response 106. According to an advantage of the invention, returning ranked entity bin list 152 in query response 106 provides results to a query based on the ranked bins of distinct collections of records by relevance to queries, rather than ranking individual records or individual records in bins by relevance to a query, which improves the likelihood that the entity bin with the highest ranking is a collection of passages related to the target entity the user intended to search for. In one example, while query system 120 may also apply additional scoring components for individually scoring a document associated with a passage in bins 124 or may individually score a passage in bins 124, according to an advantage of the invention, relevance scorer 132 determines an overall score for an entire collection of document passages in an entity bin, which ranking controller 150 then compares against other scored collections of document passages, to return ranked collections of documents in entity bins, which may also include individually scored passages.

In one embodiment, query system 120 is provided as a stand-alone service that may be installed by a client on a server or other system. In another embodiment, query system 120 is provided as a cloud or network service. In additional or alternate embodiments, instances of query system 120 are supported, delivered, or accessed on one or more additional or alternate platforms.

Figure 2:
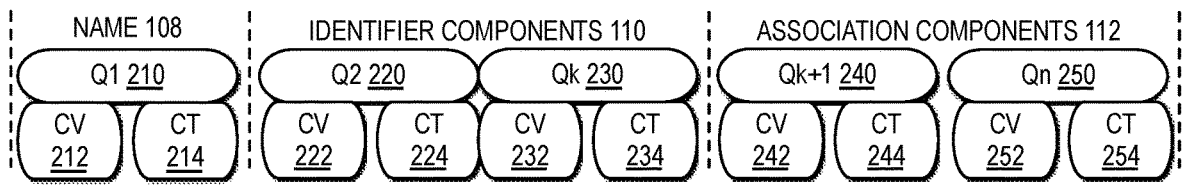

FIG. 2 illustrates a block diagram of components of a complex query received by a query system that returns entity bins ranked by relevance to the complex query, each entity bin including a collection of documents that an entity name occurs in.

In one example, user query 104 includes multiple components, Q1 to Qn, illustrated in the example by Q1 210, Q2 220, Qk 230, Qk+1 240, and Qn 250. In one example, each of components Q1 to Qn represent a component pair comprising a component value (CV) and a component type (CT). For example, Q1 210 includes a CV 212 and a CT 214, Q2 220 includes a CV 222 and a CT 224, Qk 230 includes a CV 232 and a CT 234, Qk+1 240 includes a CV 242 and a CT 244, and Qn 250 includes a CV 252 and a CT 254.

In the example, each user query 104 includes at least one non-null component of Q1 210, which represents name component 108. In the example, user query 104 may include one or more of identifier components 110 within query components Q2 to Qk, illustrated by Q2 220 through Qk 230, and may include one or more of association components 112 within query components Qk+1 to Qn, illustrated by Qk+1 240 to Qn 250. In the example, one or more of query components Q2 through Qn may include one or more null components. In one example, the value of "n" may be fixed for queries managed by query system 120.

Figure 3:
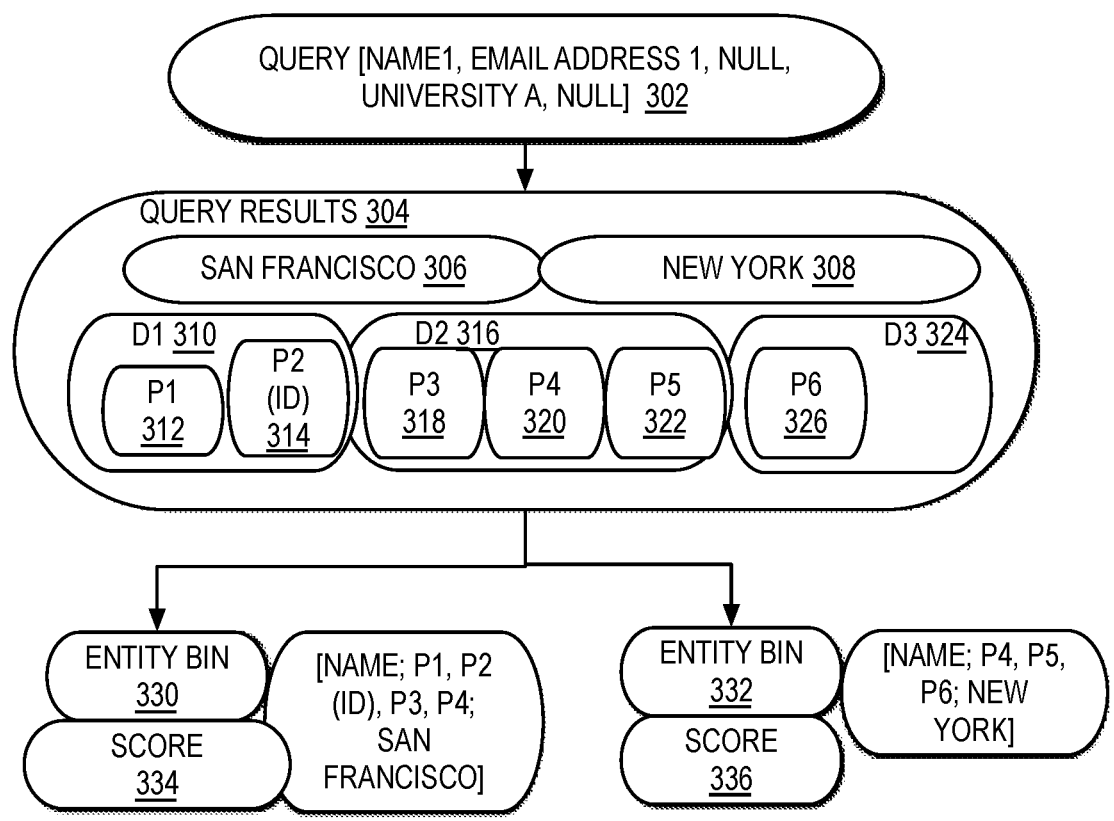

FIG. 3 illustrates a block diagram of one example of entity bins ranked by relevance to a complex query, each entity bin including a collection of documents that an entity name occurs in.

In a first example, query system 120 receives a query 302, including a "name1" with a component type of name component 108, an email address of "email address 1" of a component type of identifier components 110, a null value of a component type of identifier components 110, a college identifier of "University A" with a component type of association components 112, and a null value of a component type of association components 112. In response to query 302, entity discovery system 130 discovers query results 304. In the example, query results 304 includes multiple documents illustrated as D1 310, D2 316, and D3 322. In the example, each document includes one or more passages that each include "name1", illustrated as P1 312 in D1 310, P3 318, P4 320, P5 322 in D2 316, and P5 326 in D3 324. In addition, in the example, each document includes a passage that includes "email address 1", illustrated as P2 (ID) 314 in D1 310, where the "(ID)" distinguishes a passage mention for an identifier component.

In one example, bin control 122 evaluates query results 304 and collects passages of the documents into entity bins, each identified by a tuple of an entity name, "name1", a collection of document passages "name1" occurs in, and the relationships for "lives in" that "name1" participates in. In particular, in the example, the name "name1" results have "lives in" relationships related to "San Francisco" 306 or "New York" 308. For example, P1 312, P2 314, P3 318, P4 320 have relationships to "San Francisco" 306 that "name1" participates in, collected in an entity bin 330, and P4 320, P5 322, and P6 326 have relationships to "New York" 308 that "name1" participates in, collected in an entity bin 332. As illustrated, by P1 312 and P2 (ID) 314, a single document may include multiple passages collected in a same bin and name components and identifier components may be mentioned in different passages or different documents. As illustrated by P3 318 and P5 322, a single document may include multiple passages that are collected in different bins. As illustrated by P4 320, a single document may include a particular passage that is collected in different bins. As illustrated by P6 326, a single document may have a single passage collected in a single bin.

In the example, relevance scorer 132 calculates a score 334 for entity bin 330 and a score 336 for entity bin 332, with each of score 334 and score 336 indicating a relevance of the entity bin to the query of a name component of "name1", identifier component of an email address of "email address 1" and association component of a college identifier of "University A". In the example, relevance scorer 132 may identify whether "email address 1" has a right relationship to the elements in entity bin 330 and entity bin 332. In the example, relevance scorer 132 may identify whether passages in entity bin 330 and entity bin 332 include "University A" and determine the frequency and proximity of "University A". In one example, where the entity bin identified with the "lives in" relationship to "San Francisco" 306 and the entity bin identified with the "lives in" relationship to "New York" 308 represent named entities both associated with a same "lives in" relationship, the presence of "lives in" may or may not aid in identifying an entity bin that most likely represents the entity name the user intended to query. In another example, where the entity bin identified with the "lives in" relationship to "San Francisco" 306 represents a named entity that performed on a sports team competing against "University A" and the entity bin identified with the "lives in" relationship to "New York" 308 represents a named entity that has attended an event at "University A", the scores calculated by relevance scorer 132 for both entity bins may be similar. In contrast, where the entity bin identified with the "lives in" relationship to "San Francisco" 306 represents a named entity that has performed research and published papers from the college identified by "University A" but the entity bin identified with the "lives in" relationship to "New York" 308 represents a named entity that has only attended an event at "University A", the frequency and type of references to "University A" for "lives in" "San Francisco" 306 should exceed the frequency and type of references to "University A" for "lives in" "New York" 308 and the score calculated by relevance scorer 132 for entity bin 330 may be higher than the score calculated by relevance scorer 132 for entity bin 332.

Figure 4:
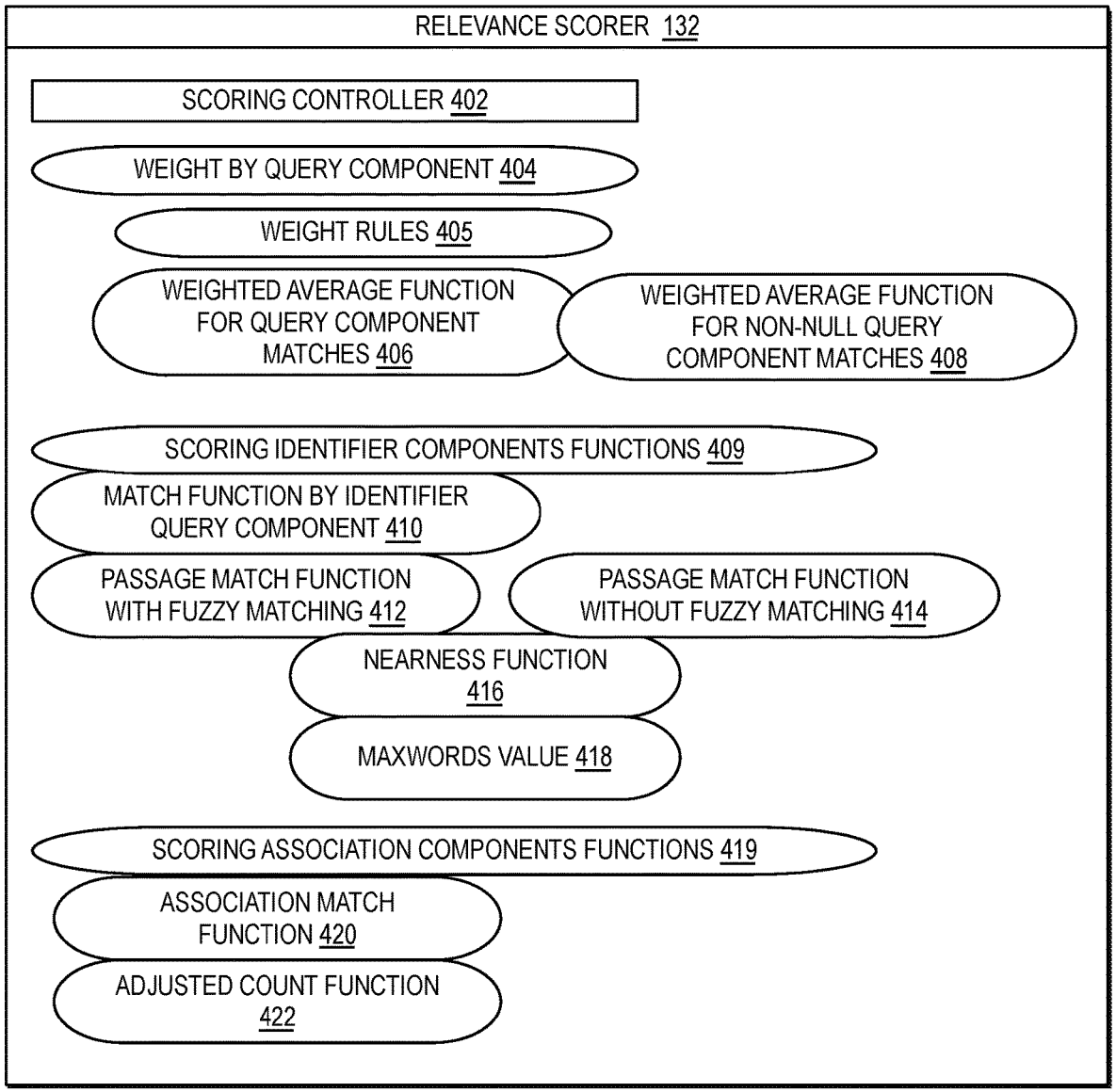
FIG. 4 is a block diagram illustrating one example of a relevance scorer for scoring collections of document passages in entity bins to indicate each entity bin's relevance to a query.

FIG. 4 illustrates a block diagram of one example of a relevance scorer for scoring collections of document passages in entity bins to indicate each entity bin's relevance to a query.

In one example, relevance scorer 132 implements a scoring controller 402 for scoring entity bins based on weighted criteria for components of a query found in passages within each clustered bin to generate a score for each bin. In one example, each query includes components $q_1$ through $q_n$, where one or more components may be null, but each query includes at least one non-null component for name component $q_1$. In one example, the value of n is fixed. In one example, each bin b is made up of passages $p_1$ through $p_m$, where each passage contains at least one $men_j$ mention of the potential query target $q_1$.

In one example, scoring controller 402 may score each bin b with respect to query q by applying one or more functions to score bins based on query components, such as weight by query components 404. In one example, weight by query components 404 determines a weight $w_i$ for each query component by weight rules 405, where weight $w_i$ may be in the range of [0,1], and a match function for each query component. In one example, weight by query components 404 includes a weighted average function for query component matches 406, whether or not the query component is null, and a weighted average function for only non-null query component matches 408. For example, weighted average function for query component matches 406 applies a function:

$$\text{Score}(q, b) = \sum_{i=1}^{n} w_i \times \text{match}(q_i, b) \bigg/ \sum_{i=1}^{n} w_i$$

In addition, for example, weighted average function for non-null query component matches 408 applies a function:

$$\text{Score}(q, b) = \sum_{i=1}^{n} \begin{cases} 0 & \text{if null}(q_i) \\ w_i \times \text{match}(q_i, b) & \text{otherwise} \end{cases} \bigg/ \sum_{i=1}^{n} \begin{cases} 0 & \text{if null}(q_i) \\ w_i & \text{otherwise} \end{cases}$$

In one example for selecting each weight $w_i$ for each query component by weight rules 405, one or more preselected rules may be applied. In another example, a client may customize one or more of weight rules 405 based on a type of component or based on a type of relationship or other distinguishing factor. For example, a client specifying a service provided by query system 120 may specify a particular rule for applying different weights to different types of association information, such as weighting business associations differently by size of company identified.

In addition, in one example, for selecting each weight $w_i$ for each query component by weight rules 405, a user may designate, in user query 104, one or more weights or one or more weight factors associated with one or more of the components, where weight rules 405 apply the user designated weights specified in user query 104. For example, user query 104 may include an additional component option for a selection of a particular set of rules in weight rules 405, where the set of rules is identified by a particular label entered in user query 405. In another example, user query 140 may include an option to insert a numerical weight corresponding to a component entry in user query 140, where weight rules 405 are set to apply numerical weights in user query 140 before applying other rules for setting weights to components.

In one example, for scoring identifier components 110 in score (q,b), a particular match function is applied for each identifier component. Relevance scorer 132 defines multiple functions with reference to scoring identifier components functions 409. In one example, scoring identifier components functions 409 applies a match function for each identifier component, illustrated as match function by query identifier component 410. In one example, for a query q, with each identifier component $q_i$, the match function is defined for a bin based on a match function for passages as the maximum passage match among the bin's passages, such as:

$$\text{match}(q_i, b) = \max_j (passagematch(q_i, p_j))$$

In addition, in one example, with scoring identifier components functions 409, the passage match function of passagematch ($q_i, p_j$) may reflect a simple determination of the number of occurrence of the identifier components in passages in a bin. In another example, to improve the precision of scoring correctly predicting a bin's relevance to the identifier component elements in query 104, relevance scorer 132 defines one or more passage match functions that consider factors in addition to number of occurrences, as illustrated by a passage match function with fuzzy matching 412 and a passage match function without fuzzy matching 414.

In the example, for passage match function with fuzzy matching 412 and a passage match function without fuzzy matching 414, for the passage match of a query identifier component $q_i$, the identifier component is defined as including the identifier string $s_i$ and a desired relationship $r_i$. In one example, desired relationship $r_i$ indicates whether the identifier component occurs either in a particular type of identified relationship, such as "email of" relationship, or by proximity, such as a co-location relationship. Scoring controller 402 assigns a score with one or more ranking characteristics including, but not limited to, (1) an extracted relationship of the string $s_i$ to a query-target mention that matches the type of relationship scores higher than an occurrence of string $s_i$ to the query-target mention without that relationship; (2) an occurrence of string $s_i$ closer to a query-target mention scores higher than an occurrence of string $s_i$ farther away, if neither has the target relationship extracted; (3) in some cases, a fuzzy match to the string $s_i$ may be acceptable and affect the score, however, in other cases, a fuzzy match may not be acceptable. For example, fuzzy matching may be applied to match different variances of elements, such as an identifier component in a query identifying a phone number as "555-555-5555" and the entity bin passage identifying a phone number as "5555555555", where fuzzy matching enables the two phone numbers to be matched even though they are written in different formats.

In one example, for scoring identifier components, passage match function without fuzzy matching 414 applies one or more functions, including, but not limited to:

$$passagematch(q_i, p_j) = \begin{cases} 1 & \text{if } p_j \text{ contains a relation of type } r_i \text{ between } men_j \text{ and } s_j \\ nearness(men_j, s_i) & \text{if } p_j \text{ contains } s_i \\ 0 & \text{otherwise} \end{cases}$$

In one example, for scoring identifier components, passage match function with fuzzy matching 412 applies one or more functions including, but not limited to:

$$passagematch(q_i, p_j) = \begin{cases} stringmatch(s_i, s_j) & \text{if } p_j \text{ contains a relation of type } r_i \text{ between } men_j \text{ and } s_j \\ stringmatch(s_i, s_j) \times \\ nearness(men_j, s_i) & \text{otherwise} \end{cases}$$

In the example, $s_j$ is defined as the token within $p_j$ that is the closest match to $s_i$, by a string match function applied. For example, a string match function may search a string for a match against a regular expression, and return the matches as an array object. In the example for passage match function with fuzzy matching 412, if there no non-zero match to $s_i$, then $s_i$ becomes 0.

Both passage match function with fuzzy matching 412 and passage match function without fuzzy matching 414 may apply a nearness function 416 for evaluating the nearness of identifier component mentions $men_j$, such as, but not limited to:

$$nearness(men_j, s_i) = max(0, maxwords - dist(men_j, s_i)/maxwords)$$

In the example, a maxwords value 418 may be set to a maximum number of words, such as 100 or 200 words.

In the example, for scoring association components, for an association component $q_i$, scoring controller 402 applies scoring association components functions 419. In the example, an association string $s_i$ and a desired relationship $r_i$ are extracted from the association identifiers. In one example, scoring association components functions 419 defines an association match function 420 for a bin based on a match function for passages with ranking characteristics that prefers a recognized relationship of the right type, and in the absence of that prefers a frequently mentioned association to a rarely mentioned one. For example, association match function 420 captures the probability that an entity that is mentioned frequently in a bin is a better match for an association than one mentioned infrequently.

For example, association match function 420, without fuzzy matching, applied by scoring controller 402 includes, but is not limited to:

$$match(q_i, b) = \begin{cases} 1 & \text{if } \exists p_j \in b \mid p_j \text{ contains a relation of type } r_i \text{ between } men_j \text{ and } s_i \\ adjusted\_count(s_i, b) & \text{if } \exists p_j \in b \mid p_j \text{ contains } s_j \\ 0 & \text{otherwise} \end{cases}$$

In the example, association match function 420 effectively performs a frequency determination roughly relative to the number of passages in the bin, but a large bin may also have many passages without the association component. In the example, frequency may be defined in terms of the number of passages containing mentions, or relative to the total number of mentions in the bin of any entity of the same type. In another example, association match function 420 may apply fuzzy matching, such as applied in passage match function with fuzzy matching 412.

In one example, association match function 420 calls an adjusted count function 422, which is based on a probability that an entity that is mentioned frequently in a bin is a better match for an association than one that is mentioned infrequently. For example, two bins may both mention an organization specified as an association component in a query as an individual's employer, but a bin in which every passage mentions that organization is a more likely match than a bin in which that organization is mentioned once. In a first example, adjusted count function 422 takes a percentage of passages in the bin that include a mention of the entity matching an association component and multiply by some constant factor, then apply a ceiling of 1, where the probability is that anything mentioned in over k % of the passages, such as at least half the passages, is a full match and all other mentions scale accordingly. In a second example, adjusted count function 422 takes a number of mentions in any passages in the bin of the same type as the associated entity as a numerator, and the number of matches to the entity string as a denominator to determine an adjusted count ratio. For example, if the query includes an association component with "name1" and "UniversityA" and the relationship "name1 STUDIED AT UniversityA", then the adjusted count function ratio is greater to increase the score.

Figure 5:
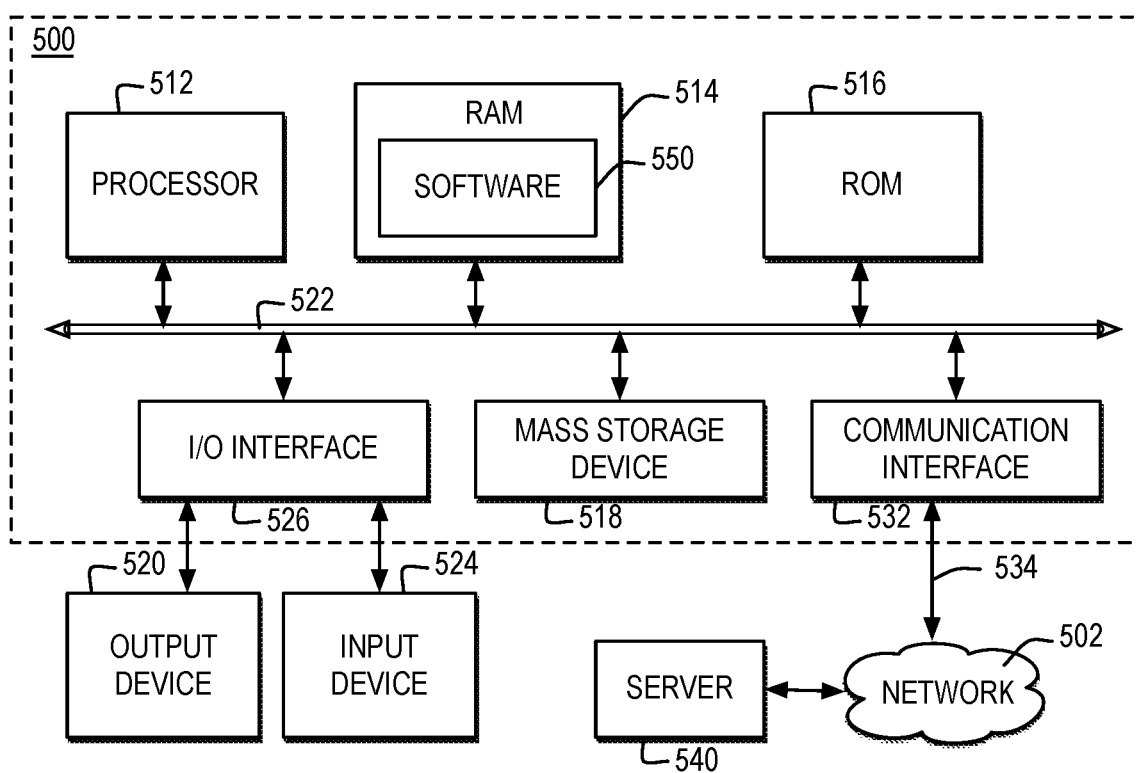
FIG. 5 is a block diagram illustrating one example of a computer system in which one embodiment of the invention may be implemented.

FIG. 5 illustrates a block diagram of one example of a computer system in which one embodiment of the invention may be implemented. The present invention may be performed in a variety of systems and combinations of systems, made up of functional components, such as the functional components described with reference to a computer system 500 and may be communicatively connected to a network, such as network 502.

Computer system 500 includes a bus 522 or other communication device for communicating information within computer system 500, and at least one hardware processing device, such as processor 512, coupled to bus 522 for processing information. Bus 522 preferably includes low-latency and higher latency paths that are connected by bridges and adapters and controlled within computer system 500 by multiple bus controllers. In one embodiment, when implemented as a server or node, computer system 500 includes multiple processors designed to improve network servicing power.

In one embodiment, processor 512 is at least one general-purpose processor that, during normal operation, processes data under the control of software 550, which includes at least one of application software, an operating system, middleware, and other code and computer executable programs accessible from a dynamic storage device such as random access memory (RAM) 514, a static storage device such as Read Only Memory (ROM) 516, a data storage device, such as mass storage device 518, or other data storage medium. In one embodiment, software 550 includes, but is not limited to, code, applications, protocols, interfaces, and processes for controlling one or more systems within a network including, but not limited to, an adapter, a switch, a server, a cluster system, and a grid environment.

In one embodiment, computer system 500 communicates with a remote computer, such as server 540, or a remote client. In one example, server 540 is connected to computer system 500 through any type of network, such as network 502, through a communication interface, such as network interface 532, or over a network link connected, for example, to network 502.

In one embodiment, multiple systems within a network environment are communicatively connected via network 502, which is the medium used to provide communications links between various devices and computer systems communicatively connected. Network 502 includes permanent connections such as wire or fiber optics cables and temporary connections made through telephone connections and wireless transmission connections, for example, and may include routers, switches, gateways and other hardware to enable a communication channel between the systems connected via network 502. Network 502 represents one or more of packet-switching based networks, telephony based networks, broadcast television networks, local area and wire area networks, public networks, and restricted networks.

Network 502 and the systems communicatively connected to computer 500 via network 502 implement one or more layers of one or more types of network protocol stacks which may include one or more of a physical layer, a link layer, a network layer, a transport layer, a presentation layer, and an application layer. For example, network 502 implements one or more of the Transmission Control Protocol/Internet Protocol (TCP/IP) protocol stack or an Open Systems Interconnection (OSI) protocol stack. In addition, for example, network 502 represents the worldwide collection of networks and gateways that use the TCP/IP suite of protocols to communicate with one another. Network 502 implements a secure HTTP protocol layer or other security protocol for securing communications between systems.

In the example, network interface 532 includes an adapter 534 for connecting computer system 500 to network 502 through a link and for communicatively connecting computer system 500 to server 540 or other computing systems via network 502. Although not depicted, network interface 532 may include additional software, such as device drivers, additional hardware and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

Figure 6:
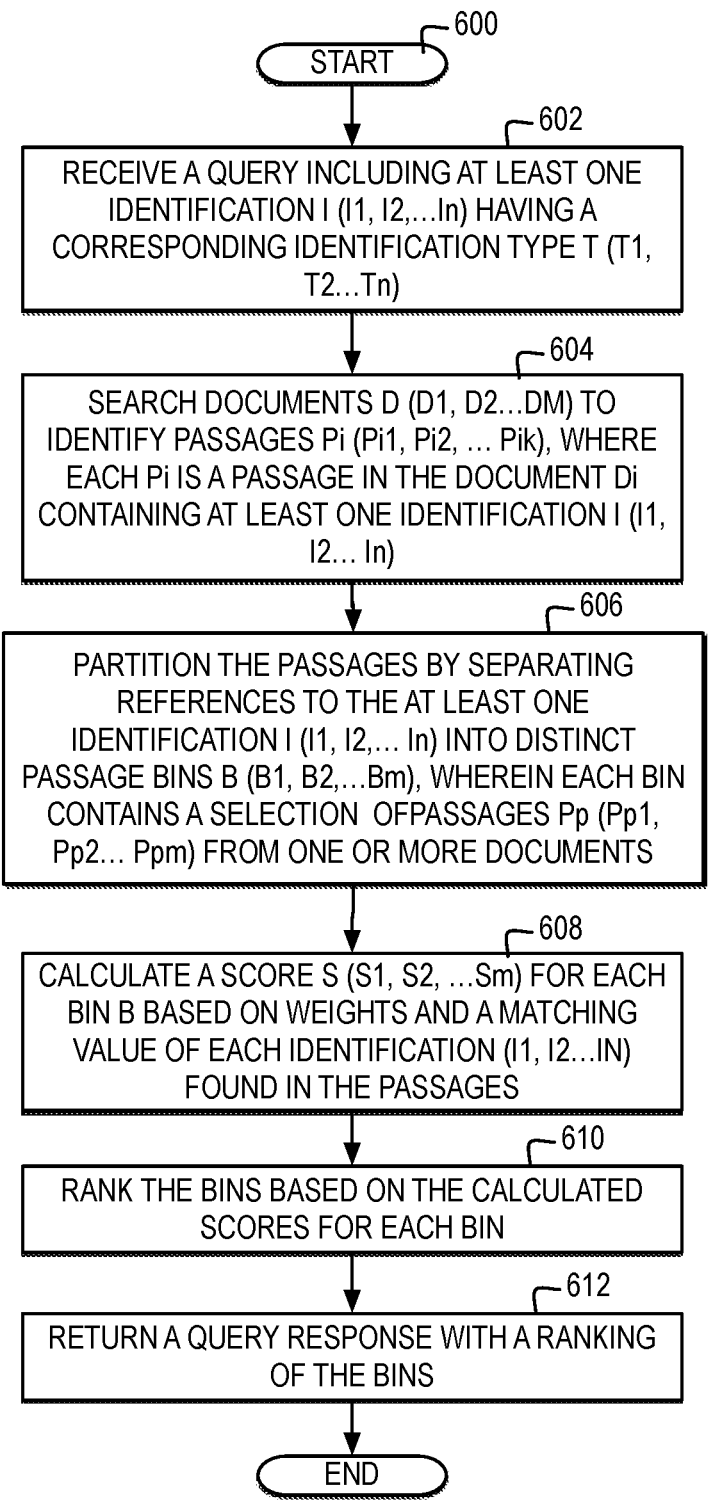
FIG. 6 illustrates a high level logic flowchart of a process and computer program for ranking collections of document passages that an entity name occurs in, collected in entity bins, by relevance to a complex query.
Figure 7:
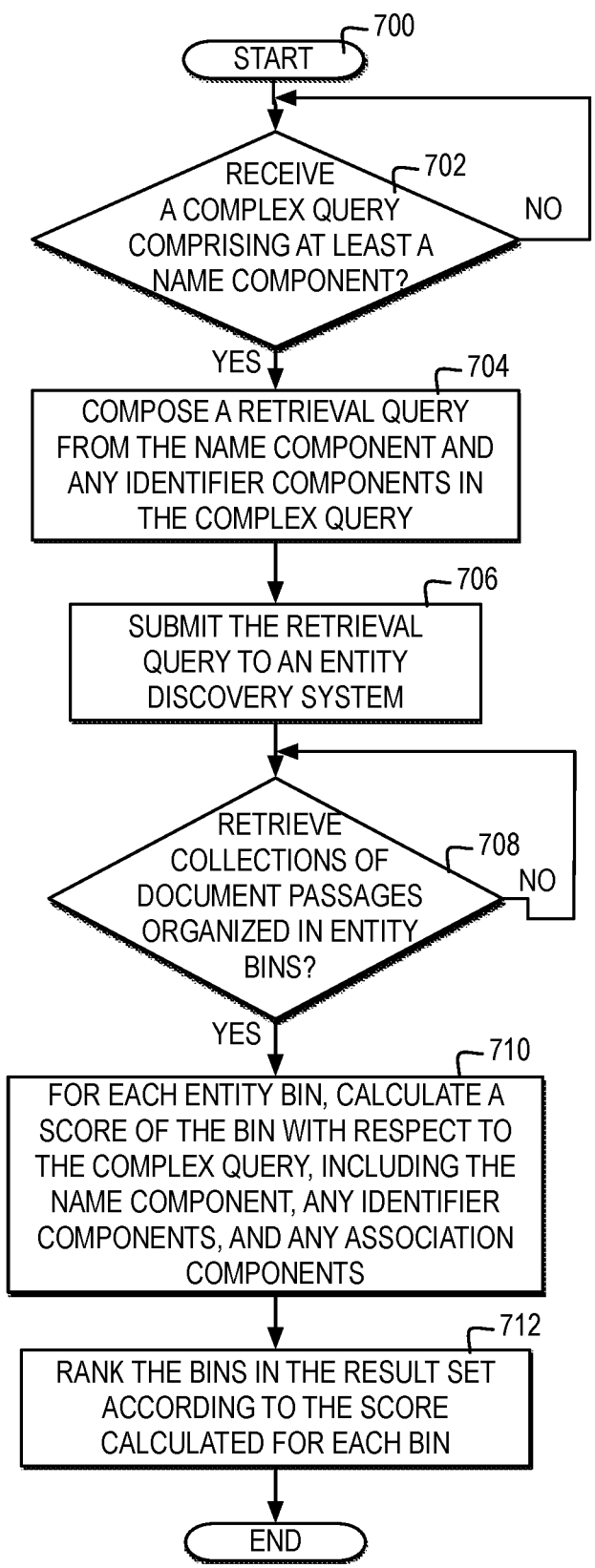
FIG. 7 illustrates a high level logic flowchart of a process and computer program for ranking collections of document passages that an entity name occurs in, collected in entity bins, by relevance to a complex query including at least a name component and may include one or more identifier components and one or more association components.
Figure 8:
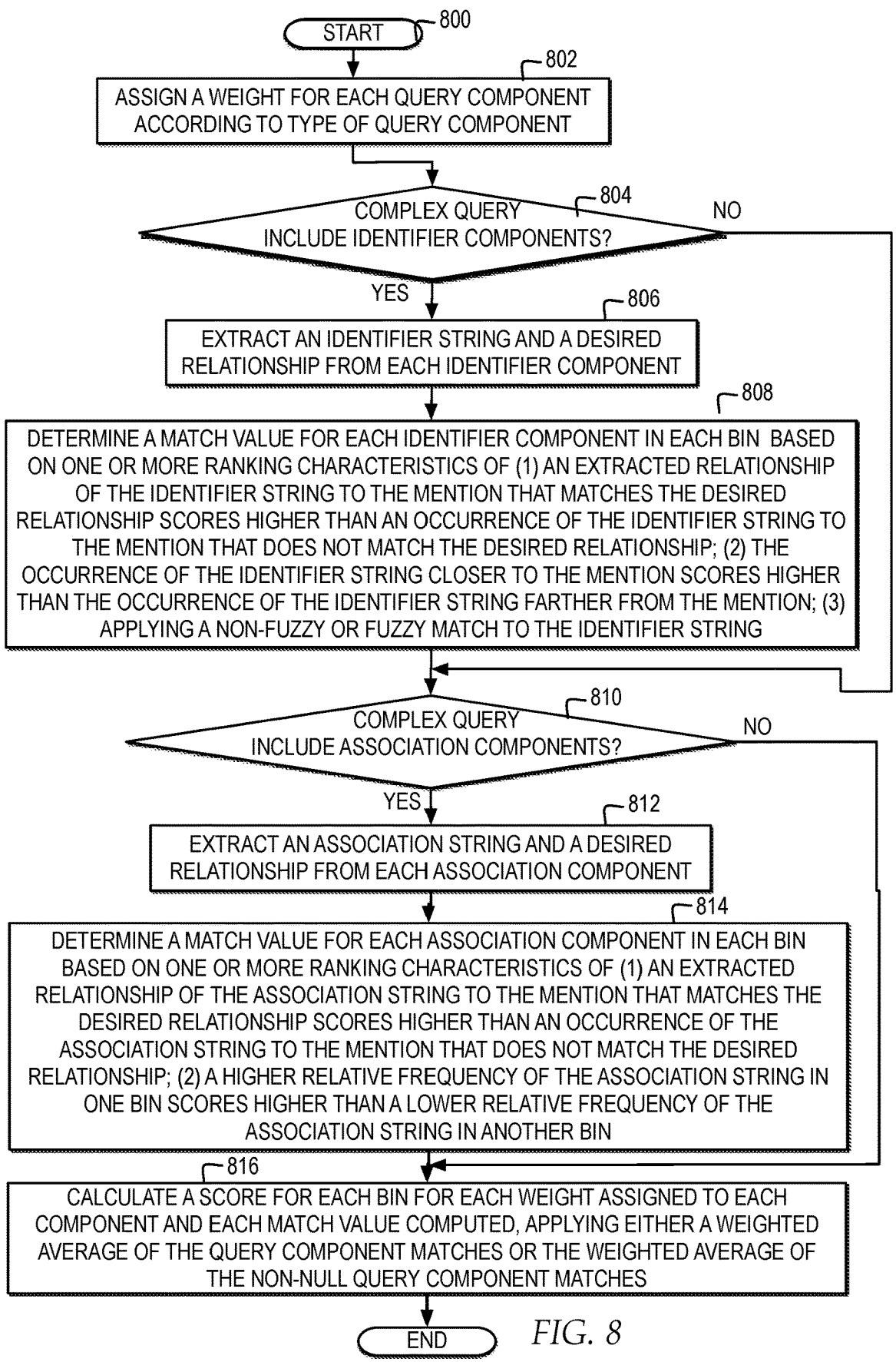
FIG. 8 illustrates a high level logic flowchart of a process and computer program for scoring collections of document passages that an entity name occurs in, collected in entity bins, by relevance to a complex query.

In one embodiment, the operations performed by processor 512 control the operations of flowchart of FIGS. 6-8 and other operations described herein. In one embodiment, operations performed by processor 512 are requested by software 550 or other code or the steps of one embodiment of the invention might be performed by specific hardware components that contain hardwired logic for performing the steps, or by any combination of programmed computer components and custom hardware components. In one embodiment, one or more components of computer system 500, or other components, which may be integrated into one or more components of computer system 500, contain hardwired logic for performing the operations of flowcharts in FIGS. 6-8.

In one embodiment, computer system 500 includes multiple peripheral components that facilitate input and output. These peripheral components are connected to multiple controllers, adapters, and expansion slots, such as input/output (I/O) interface 526, coupled to one of the multiple levels of bus 522. For example, input device 524 includes, for example, a microphone, a video capture device, an image scanning system, a keyboard, a mouse, or other input peripheral device, communicatively enabled on bus 522 via I/O interface 526 controlling inputs. In addition, for example, output device 520 communicatively enabled on bus 522 via I/O interface 526 for controlling outputs include, for example, one or more graphical display devices, audio speakers, and tactile detectable output interfaces, but in another example also includes other output interfaces. In alternate embodiments of the present invention, additional or alternate input and output peripheral components may be added.

With respect to FIG. 5, the one or more embodiments present invention including, but are not limited to, a system, a method, and/or a computer program product. In one embodiment, the computer program product includes a computer readable storage medium (or media) having computer readable program instructions thereon for causing a processor to carry out aspects of the present invention.

In one embodiment, the computer readable storage medium is a tangible device that can retain and store instructions for use by an instruction execution device. The computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of the present invention include one or more of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one example, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that in additional or alternate embodiments, the hardware depicted in FIG. 5 may vary. Furthermore, those of ordinary skill in the art will appreciate that the depicted example is not meant to imply architectural limitations with respect to the present invention.

FIG. 6 illustrates a high level logic flowchart of a process and computer program for ranking collections of document passages that an entity name occurs in, collected in entity bins, by relevance to a complex query.

In one example, the process and program starts at block 600 and thereafter proceeds to block 602. Block 602 illustrates receiving a query including at least one identification (I1, I2, ... In) having a corresponding identification type T (T1, T2, ... Tn). Next, block 604 illustrates searching documents D (D1, D2, ... Dm) to identify passages Pi (Pi1, Pi2, ... Pik) where each Pi is a passage in the document Di containing at least one identification I (I1, I2, ... In). Thereafter, block 606 illustrates partitioning the passages by separating references to the at least one identification I (I1, I2, ... In) into distinct passage bins B (B1, B2, ... Bm) wherein each bin contains a selection of passages Pp (Pp1, Pp2, ... Ppm) from one or more documents. Next, block 608 illustrates calculating a score S (S1, S2, ... Sm) for each bin B based on weights and a matching value of each identification I (I1, I2, ... In) found in the passages. Thereafter, block 610 illustrates ranking the bins based on the calculated scores for each bin. Next, block 612 illustrates returning a query response with a ranking of the bins, and the process ends.

FIG. 7 illustrates a high level logic flowchart of a process and computer program for ranking collections of document passages that an entity name occurs in, collected in entity bins, by relevance to a complex query including at least a name component and may include one or more identifier components and one or more association components.

In one example, the process and program starts at block 700 and thereafter proceeds to block 702. Block 702 illustrates a determination with a complex query comprising at least one name component is received. At block 702, if a complex query comprising at least one name component is received, then the process passes to block 704. Block 704 illustrates composing a retrieval query from the name component and any identifier components in the complex query. Next, block 706 illustrates submitting the retrieval query to an entity discovery system for searching a document corpus with the retrieval query, and the process passes to block 708.

Block 708 illustrates a determination whether collections of document passages organized in entity bins are retrieved from the complex query. At block 708, entity bins are retrieved, then the process passes to block 710. Block 710 illustrates, for each entity bin, calculating a score of the bin with respect to the complex query, including the name component, any identifier components, and any association components. Next, block 712 illustrates ranking the bins in the result set according to the score calculated for each bin, and the process ends.

FIG. 8 illustrates a high level logic flowchart of a process and computer program for scoring collections of document passages that an entity name occurs in, collected in entity bins, by relevance to a complex query.

In one example, the process and program starts at block 800 and thereafter proceeds to block 802. Block 802 illustrates assigning a weight for each query component according to type of query component. Next, block 804 illustrates a determination whether the complex query includes identifier components. At block 804, if the complex query does not include identifier components, then the process passes to block 808. At block 804, if the complex query does include identifier components, then the process passes to block 806. Block 806 illustrates extracting an identifier string and desired relationship from each identifier component. Block 808 illustrates determining a match value for each identifier component in each bin based on one or more ranking characteristics of (1) an extracted relationship of the identifier string to the mention that matches the desired relationship scores higher than an occurrence of the identifier string to the mention that does not match the desired relationship; (2) the occurrence of the identifier string closer to the mention scores higher than the occurrence of the identifier string farther from the mention; (3) applying a non-fuzzy or fuzzy match to the identifier string, and the process passes to block 810.

Block 810 illustrates a determination whether the complex query includes association components. At block 810, if the complex query does not include association components, then the process passes to block 816. At block 810, if the complex query does include association components, then the process passes to block 812. Block 812 illustrates extracting an association string and desired relationship from each association component. Next, block 814 illustrates determining a match value for each association component in each bin based on one or more ranking characteristics of (1) an extracted relationship of the association string to the mention that matches the desired relationship scores higher than an occurrence of the association string to the mention that does not match the desired relationship; (2) a higher relative frequency of the association string in one bin scores higher than a lower relative frequency of the association string in another bin, and the process passes to block 816. Block 816 illustrates calculating a score for each bin for each weight assigned to each component and each match value computed, applying either a weighted average of the query component matches or the weighted average of the non-null query component matches, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The foregoing description is just an example of embodiments of the invention, and variations and substitutions. While the invention has been particularly shown and described with reference to one or more embodiments, it will be understood by those skilled in the art that various changes in form and detail may be made therein without departing from the spirit and scope of the invention.

What is claimed is:

1. A method comprising:
   receiving, by a computer system, a query comprising at least a name component and one or more identifier components identifying one or more particular entities associated with the name component;
   searching, by the computer system, a plurality of documents in a document corpus to identify a plurality of passages each comprising a mention of the name component within a selection of one or more documents of the plurality of documents;
   collecting, by the computer system, a plurality of bins each comprising a distinct selection of the plurality of passages from the one or more documents, each of the plurality of bins identifying a separate relationship the name component and the one or more identifier components participate in within the distinct selection of the plurality of passages;
   extracting, by the computer system, from each of the one or more identifier components in each respective bin, an identifier string and a desired relationship;
   calculating, by the computer system, one or more match values for each of the one or more identifier components in each respective bin, the one or more match values based, at least in part, on: (i) the desired relationship, and (ii) a closeness of the identifier string to the mention;

assessing, by the computer system, a separate score of each respective bin of the plurality of bins reflecting the relevance of each respective bin to the query, the separate score based, at least in part, on the calculated one or more match values for the one or more identifier components in the respective bin; and returning, by the computer system, a response to the query with the plurality of bins each ranked according to each separate score.

2. The method of claim 1, wherein the one or more match values are further based, at least in part, on whether a fuzzy match to the identifier string is acceptable.

3. The method of claim 1, wherein the one or more match values are further based, at least in part, on one or more identifier ranking characteristics.

4. The method of claim 3, further comprising:
evaluating, by the computer system, a ranking characteristic of the one or more identifier ranking characteristics such that an extracted relationship of the identifier string to the mention that matches the desired relationship scores higher than an occurrence of the identifier string to the mention that does not match the desired relationship.

5. The method of claim 3, further comprising:
evaluating, by the computer system, a ranking characteristic of the one or more identifier ranking characteristics such that an occurrence of the identifier string closer to the mention scores higher than the occurrence of the identifier string farther from the mention.

6. The method of claim 5, wherein evaluating the ranking characteristic of the one or more ranking characteristics comprises:
evaluating, by the computer system, a nearness of the occurrence of the identifier string to the mention based on a nearness percentage of the identifier string to the mention in view of a maximum number of words set to a maxwords value.

7. The method of claim 1, wherein:
the query further comprises one or more association components each for indicating or counter-indicating a particular entity associated with the name component; and
the separate score is further based, at least in part, on one or more additional match values calculated for each of the one or more identifier components in each respective bin based on one or more association ranking characteristics.

8. The method of claim 7, further comprising:
calculating, by the computer system, the one or more additional match values for each of the one or more identifier components in each respective bin based on the one or more association ranking characteristics by extracting an association string and a desired relationship from each of the one or more association components;
evaluating, by the computer system, a first ranking characteristic of one or more association ranking characteristics such that an extracted relationship of the association string to the mention that matches the desired relationship scores higher than an occurrence of the association string to the mention that does not match the desired relationship; and
evaluating, by the computer system, a second ranking characteristic of one or more association ranking characteristics such that a higher relative frequency of the association string in one bin of the plurality of bins scores higher than a lower relative frequency of the association string in another bin of the plurality of bins.

9. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:

program instructions to receive a query comprising at least a name component and one or more identifier components identifying one or more particular entities associated with the name component;

program instructions to search a plurality of documents in a document corpus to identify a plurality of passages each comprising a mention of the name component within a selection of one or more documents of the plurality of documents;

program instructions to collect a plurality of bins each comprising a distinct selection of the plurality of passages from the one or more documents, each of the plurality of bins identifying a separate relationship the name component and the one or more identifier components participate in within the distinct selection of the plurality of passages;

program instructions to extract, from each of the one or more identifier components in each respective bin, an identifier string and a desired relationship;

program instructions to calculate one or more match values for each of the one or more identifier components in each respective bin, the one or more match values based, at least in part, on: (i) the desired relationship, and (ii) a closeness of the identifier string to the mention;

program instructions to assess a separate score of each respective bin of the plurality of bins reflecting the relevance of each respective bin to the query, the separate score based, at least in part, on the calculated one or more match values for the one or more identifier components in the respective bin; and program instructions to return a response to the query with the plurality of bins each ranked according to each separate score.

10. The computer system of claim 9, wherein the one or more match values are further based, at least in part, on whether a fuzzy match to the identifier string is acceptable.

11. The computer system of claim 9, wherein the one or more match values are further based, at least in part, on one or more identifier ranking characteristics.

12. The computer system of claim 11, the stored program instructions further comprising:
program instructions to evaluate a ranking characteristic of the one or more identifier ranking characteristics such that an extracted relationship of the identifier string to the mention that matches the desired relationship scores higher than an occurrence of the identifier string to the mention that does not match the desired relationship.

13. The computer system of claim 11, the stored program instructions further comprising:
program instructions to evaluate a ranking characteristic of the one or more identifier ranking characteristics such that an occurrence of the identifier string closer to the mention scores higher than the occurrence of the identifier string farther from the mention.

14. The computer system of claim 13, wherein the program instructions to evaluate the ranking characteristic of the one or more ranking characteristics comprise:

program instructions to evaluate a nearness of the occurrence of the identifier string to the mention based on a nearness percentage of the identifier string to the mention in view of a maximum number of words set to a maxwords value.

15. A computer program product comprising a computer readable storage medium having program instructions embodied therewith, wherein the computer readable storage medium is not a transitory signal per se, the program instructions executable by a computer to cause the computer to:

receive, by the computer, a query comprising at least a name component and one or more identifier components identifying one or more particular entities associated with the name component;

search, by the computer, a plurality of documents in a document corpus to identify a plurality of passages each comprising a mention of the name component within a selection of one or more documents of the plurality of documents;

collect, by the computer, a plurality of bins each comprising a distinct selection of the plurality of passages from the one or more documents, each of the plurality of bins identifying a separate relationship the name component and the one or more identifier components participate in within the distinct selection of the plurality of passages;

extract, by the computer, from each of the one or more identifier components in each respective bin, an identifier string and a desired relationship;

calculate, by the computer, one or more match values for each of the one or more identifier components in each respective bin, the one or more match values based, at least in part, on: (i) the desired relationship, and (ii) a closeness of the identifier string to the mention;

assess, by the computer, a separate score of each respective bin of the plurality of bins reflecting the relevance of each respective bin to the query, the separate score based, at least in part, on the calculated one or more match values for the one or more identifier components in the respective bin; and return, by the computer, a response to the query with the plurality of bins each ranked according to each separate score.

16. The computer program product of claim 15, wherein the one or more match values are further based, at least in part, on whether a fuzzy match to the identifier string is acceptable.

17. The computer program product of claim 15, wherein the one or more match values are further based, at least in part, on one or more identifier ranking characteristics.

18. The computer program product of claim 17, the program instructions further executable by the computer to cause the computer to:

evaluate, by the computer, a ranking characteristic of the one or more identifier ranking characteristics such that an extracted relationship of the identifier string to the mention that matches the desired relationship scores higher than an occurrence of the identifier string to the mention that does not match the desired relationship.

19. The computer program product of claim 17, the program instructions further executable by the computer to cause the computer to:

evaluate, by the computer, a ranking characteristic of the one or more identifier ranking characteristics such that an occurrence of the identifier string closer to the mention scores higher than the occurrence of the identifier string farther from the mention.

20. The computer program product of claim 19, wherein evaluating the ranking characteristic of the one or more ranking characteristics comprises:

evaluating, by the computer, a nearness of the occurrence of the identifier string to the mention based on a nearness percentage of the identifier string to the mention in view of a maximum number of words set to a maxwords value.

\* \* \* \* \*